Jan. 12, 1954

W. C. CASSELMAN 2,665,591

DEVICE FOR SPINNING FISH DECOYS

Filed June 19, 1950

William C. Casselman

INVENTOR.

BY *Clarence A. O'Brien*
*and Harvey B. Jacobson*
Attorneys

Patented Jan. 12, 1954

2,665,591

UNITED STATES PATENT OFFICE 2,665,591

DEVICE FOR SPINNING FISH DECOYS

William C. Casselman, Erskine, Minn.

Application June 19, 1950, Serial No. 168,903

4 Claims. (Cl. 74—209)

This invention relates to new and useful improvements in a device for spinning a fish decoy and particularly to an electric drive for a fish decoy spinner of the type utilized for spinning a fish lure beneath a surface of ice as an aid for fishermen spearing fish from a dark house.

The primary object of this invention is to provide a device which will rotate a decoy or fish lure.

Another important object of this invention is to provide a device of this character in which the speed at which the decoy is rotated may be controlled and which will operate continuously without requiring frequent supervision.

Another important feature of the present invention resides in the motor being mounted so that its weight acts to retain a shaft and a friction wheel in operative engagement.

Still another feature of the present invention resides in the means for rotatably mounting the shaft and the friction wheel to extend through the bottom of the housing.

A final important feature to be specifically enumerated herein resides in the device being adapted to operate on a minute 1½ volt electric motor and the common flashlight battery cells, together with a variable rheostat for controlling the speed at which the motor is operated as well as conserving the battery.

These, together with various ancillary features and objects of the invention which will later become apparent as the following description proceeds, are attained by the present invention, a preferred embodiment of which has been illustrated by way of example only in the accompanying drawings, wherein.

Reference is now made more specifically to the accompanying drawings, wherein like numerals designate similar parts throughout the various views, and in which the numeral 10 designates the decoy spinner generally, which includes a housing formed of a bottom wall 12 and a top wall 14 carrying depending side walls 16.

Figure 3:
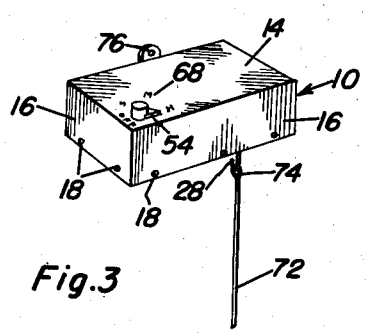
Figure 3 is a perspective of the present invention showing a decoy supported from the device by an attaching line.

While the housing may conveniently be provided with any suitable type of hinged cover so that access may be had to the interior thereof, a satisfactory arrangement that is economical for this purpose is achieved in the present invention by having the peripheral edges of the bottom wall 12 removably received within the lower edges of the side walls 16 and detachably retained therein by means of screws 18 extending through the side walls 16 into the edges of the bottom wall 12, as clearly shown in Figure 3.

The bottom wall 12 is provided with an opening 20 over which is disposed a bearing block 22 that is carried within the housing and suitably secured to the bottom wall 12. The bearing block 22 is provided with a bore 24 in alignment with the opening 20 through which bore 24 is journaled a shaft 26 that extends downwardly below the bottom wall 12 and terminates in a hook 28 at its lower end.

The upper end of the shaft 26 has secured thereto a friction wheel 30 and a washer 32 together with an apertured bead or ball 34 are disposed on the shaft 26 between the friction wheel 30 and the bearing block 22 to constitute a thrust bearing for the shaft 26, the arrangement being such that the friction wheel 30 together with the shaft 26 are free to rotate for a purpose to presently become apparent.

Figure 1:
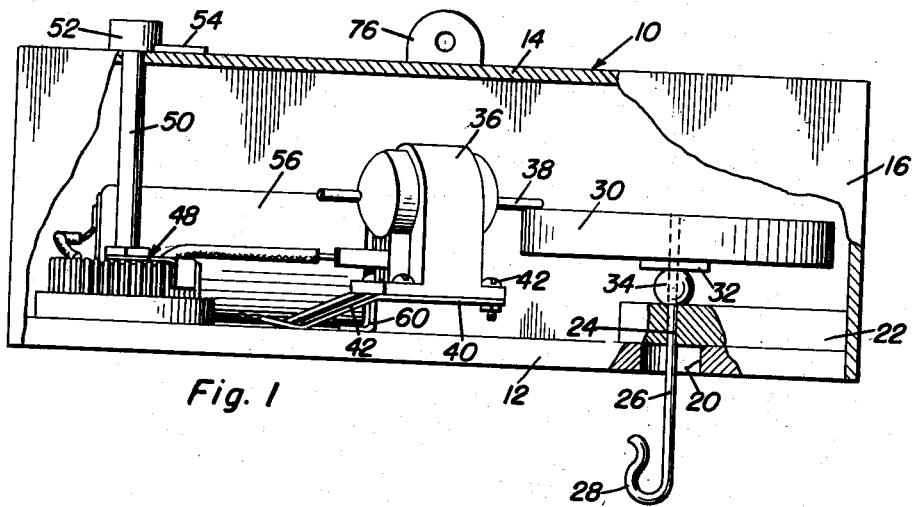
Figure 1 is a side elevational view of the present invention with portions of the same being broken away and shown in section.
Figure 2:
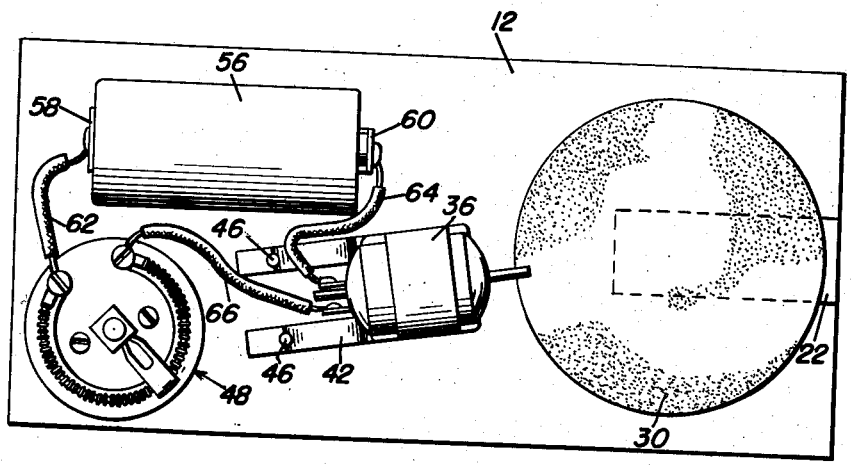
Figure 2 is a top plan view of the device with the top and side walls of the housing removed, and concealed portions of the bearing block being indicated in dotted outline.

Means is provided for controllably driving the friction wheel 30 which includes an electric motor 36 having a driving shaft 38 that extends radially with respect to and rests upon the upper surface of the friction wheel 30 as clearly shown in Figures 1 and 2. The electric motor 36 may be very small and is preferably of the 1½ volt D. C. type available on the open market.

A support bracket is provided for the electric motor 36 which includes a platform 40 to which the motor 36 is suitably secured by fasteners 42, and from one edge of the platform 40 depend inclined legs 42. The bracket including the legs 42 is preferably of resilient material to permit downward flexing of the platform 40, and in addition the legs 42 are loosely secured to the bottom wall 12 as at 46 so that the electric motor 36 and its shaft 38 will be permitted a limited amount of downward movement, so that the electric motor 36 will be partially supported by the shaft 38 resting upon the friction wheel 30, thereby insuring a dependable frictional driving connection between the shaft 38 and the friction wheel 30 despite wear of the parts.

A variable rheostat designated generally at 48 is mounted within the housing upon the bottom wall 12 which is adjusted by means of a rheostat control post 50 that extends upwardly and rotatably through the top wall 14, as is clearly shown in Figure 1. The upper extremity of the post 50 is provided with a control knob 52 having an indicator pointer 54 attached thereto.

A battery 56 preferably of the conventional 1½ volts dry-cell battery type is disposed within the housing and removably secured to the bottom wall 12 by any suitable means such as spring clips or the like. Means is carried by the bottom wall 12 for establishing electrical connection with the battery 56 which includes terminal strips 58 and 60, the former of which is connected to one terminal of the rheostat 48 by an electrical lead 62, and the latter is electrically connected to one terminal of the electric motor 36 by a lead 64, while the other terminals of the rheostat and the electric motor are connected by a further electrical lead 66, the arrangement being such that the battery 56, the variable rheostat 48 and the electric motor 36 are in series and the speed of the electric motor as well as the shutting off of power thereto may be controlled by the variable rheostat 48. Indicia 68 is provided on the top wall 14 to be used in conjunction with the pointer 54 to indicate the speed setting of the rheostat as well as whether the rheostat is set in the off position.

As clearly shown in Figure 3, a decoy or lure 70 is detachably supported from the hook 28 by means of an attaching line 72 having a loop 74 formed at its upper end, the arrangement being such that when the shaft 26 rotates, rotation will be imparted to the decoy 70.

In use, the housing is supported on the wall of a dark house, not shown, by a bracket 76 provided for this purpose in a position above an opening that is provided through the ice, so that the attaching line 72 may extend downwardly therethrough and the decoy 70 supported in the water below the ice. The decoy 70 may then be rotated at any desired speed of rotation, and the fisherman may then devote his undivided attention to the business of spotting and spearing fish. The device 10 requires the very minimum of attention itself and may be relied upon for continuous operation for long intervals of time, since it has been found that the same may be driven by a single battery cell for periods as long as 10 hours without requiring replacement. Although it will be understood that a spring mechanism could be provided within the housing for driving the shaft 26 and even though such mechanism could incorporate an escapement for controlling the speed of rotation, it will be readily apparent that the present invention provides numerous advantages over such an arrangement.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having described the invention, what is claimed as new is:

1. A device for spinning a fish decoy comprising a base, a shaft extending through the base for rotation about a vertical axis, said shaft having means at its lower end for supporting a fish decoy, a friction wheel on said shaft, an electric motor having frictional driving engagement with the wheel, and electric battery and an electrical circuit connecting said battery to the motor, a thrust bearing for said shaft between the base and the wheel, and means for controlling the electrical energy supplied to the motor from the battery.

2. In a fish decoy spinning device having a base with an opening therein, a drive comprising a bearing block mounted on said base, said bearing block having a bore in alignment with said opening, a shaft journaled in said bore and extending through said opening, a friction wheel rigidly mounted on said shaft, a bearing washer disposed on said shaft adjacent said friction wheel, an apertured spherical bearing mounted on said shaft between said bearing block and said bearing washer, an electric motor operatively connected to said friction wheel, control means for said electric motor.

3. In a device for spinning a fish decoy having a base with an opening therein, a drive comprising a bearing block mounted on said base, said bearing block having a bore in alignment with said opening, a shaft journaled in said bore and extending through said opening, a friction wheel rigidly mounted on said shaft, a bearing washer disposed on said shaft adjacent said friction wheel, an apertured spherical bearing mounted on said shaft between said bearing block and said bearing washer, an electric motor, a drive shaft in said motor, said motor being eccentrically mounted on said base adjacent said wheel whereby said drive shaft is biased into contact with said friction wheel, control means for said motor.

4. For use with a fish decoy spinning device having a housing with an opening in the bottom thereof and a shaft extending through the opening, a mounting comprising a bearing block having a bore in alignment with said opening, said shaft extending through said bore, a friction wheel rigidly mounted on the shaft, a bearing washer disposed on said shaft adjacent said friction wheel, an apertured spherical bearing journaled on said shaft between said bearing block and said bearing washer.

WILLIAM C. CASSELMAN.

References Cited in the file of this patent

UNITED STATES PATENTS

| Number | Name | Date |
| --- | --- | --- |
| Re. 17,221 | Jenkins | Feb. 19, 1929 |
| 800,334 | Stevens | Sept. 26, 1905 |
| 1,057,344 | Hayward | Mar. 25, 1913 |
| 1,122,466 | Beyer | Dec. 29, 1914 |
| 1,251,810 | Oehler | Jan. 1, 1918 |
| 1,394,417 | Kroth | Oct. 18, 1921 |
| 1,508,093 | Erhardt | Sept. 9, 1924 |